US012683217B2

(12) United States Patent
Ju et al.

(10) Patent No.: US 12,683,217 B2
(45) Date of Patent: Jul. 14, 2026

(54) BATTERY MODULE HAVING COOLING STRUCTURE USING INSULATING OIL, AND BATTERY PACK AND VEHICLE COMPRISING SAME

(71) Applicant: LG Energy Solution, Ltd., Seoul (KR)

(72) Inventors: Eun-Ah Ju, Daejeon (KR); Sung-Won Seo, Daejeon (KR); Hyeon-Ki Yun, Daejeon (KR); Guenter Tannenberger, Pobenhausen (DE); Jan Janke, Brackenheim (DE); Uwe Harasztosi, Neckarsulm (DE)

(73) Assignee: LG Energy Solution, Ltd., Seoul (KR)

( * ) Notice: Subject to any disclaimer, the term of this patent is extended or adjusted under 35 U.S.C. 154(b) by 588 days.

(21) Appl. No.: 18/020,304

(22) PCT Filed: Nov. 9, 2021

(86) PCT No.: PCT/KR2021/016281
§ 371 (c)(1),
(2) Date: Feb. 8, 2023

(87) PCT Pub. No.: WO2022/103131
PCT Pub. Date: May 19, 2022

(65) Prior Publication Data
US 2023/0261283 A1      Aug. 17, 2023

(30) Foreign Application Priority Data
Nov. 12, 2020      (KR) ........................ 10-2020-0151349

(51) Int. Cl.
*H01M 10/6556*          (2014.01)
*H01M 10/613*           (2014.01)
(Continued)

(52) U.S. Cl.
CPC ..... *H01M 10/6556* (2015.04); *H01M 10/613* (2015.04); *H01M 10/625* (2015.04);
(Continued)

(58) Field of Classification Search
CPC .................................................. H01M 10/6556
See application file for complete search history.

(56)          References Cited

U.S. PATENT DOCUMENTS 7,740,978 B2      6/2010   Hamada et al.
9,806,386 B2    10/2017   Lim
(Continued)

FOREIGN PATENT DOCUMENTS

CN          209217035 U      8/2019
CN          111129647 A      5/2020
(Continued)

OTHER PUBLICATIONS

International Search Report for PCT/KR2021/016281 mailed Mar. 2, 2022. 3 pgs.
(Continued)

*Primary Examiner* — Brian R Ohara
(74) *Attorney, Agent, or Firm* — Lerner David LLP

(57)          ABSTRACT
A battery module comprises a cell stack assembly, a front bus bar frame, and a rear bus bar frame. The cell stack assembly includes a plurality of battery cells and a plurality of fluid passage spacers located between adjacent battery cells. The front bus bar frame assembly is coupled to a side of the cell stack assembly along a longitudinal direction and includes a module inlet through which insulating oil for cooling of the plurality of battery cells is supplied to the plurality of fluid passage spacers. The rear bus bar frame assembly is coupled to the opposite side of the cell stack assembly along the longitudinal direction and includes a module outlet through which insulating oil passing through
(Continued)

the module inlet and the plurality of fluid passage spacers is discharged.

11 Claims, 7 Drawing Sheets

(51) Int. Cl.

| | | |
|---|---|---|
| *H01M 10/625* | (2014.01) |
| *H01M 10/6567* | (2014.01) |
| *H01M 50/211* | (2021.01) |
| *H01M 50/507* | (2021.01) |

(52) U.S. Cl.
CPC ..... *H01M 10/6567* (2015.04); *H01M 50/211* (2021.01); *H01M 50/507* (2021.01); *H01M 2220/20* (2013.01)

(56) References Cited

U.S. PATENT DOCUMENTS

| | | | |
|---|---|---|---|
| 11,251,474 | B2 | 2/2022 | Jung et al. |
| 2001/0026886 | A1 | 10/2001 | Inui et al. |
| 2010/0104927 | A1 | 4/2010 | Albright |
| 2015/0188203 | A1 | 7/2015 | Enomoto et al. |
| 2017/0373361 | A1 | 12/2017 | Kosaki et al. |
| 2018/0316070 | A1 | 11/2018 | Lee et al. |
| 2020/0076025 | A1 * | 3/2020 | Jo ........................ H01M 10/613 |
| 2020/0136212 | A1 * | 4/2020 | Jung ................. H01M 10/6556 |
| 2020/0168864 | A1 | 5/2020 | Seo et al. |

FOREIGN PATENT DOCUMENTS

| | | | |
|---|---|---|---|
| EP | 3660974 A1 | 6/2020 |
| JP | 2001283937 A | 10/2001 |
| JP | 2009009853 A | 1/2009 |
| JP | 4362321 B2 | 11/2009 |
| JP | 2014035969 A | 2/2014 |
| JP | 2014060088 A | 4/2014 |
| JP | 20170228495 A | 12/2017 |
| JP | 2020520067 A | 7/2020 |
| JP | 2020523756 A | 8/2020 |
| KR | 20170121555 A | 11/2017 |
| KR | 101834846 B1 | 3/2018 |
| KR | 20190064887 A | 6/2019 |
| WO | WO-2020100152 A1 * | 5/2020 | .......... H01M 10/655 |

OTHER PUBLICATIONS

Extended European Search Report including Written Opinion for Application No. 21892298.7 dated Dec. 12, 2024. 8 pgs.
Search Report dated Mar. 25, 2026 from the Office Action for Chinese Application No. 202180040537.9 issued Mar. 27, 2026, pp. 1-2.

* cited by examiner

FIG. 6

BATTERY MODULE HAVING COOLING STRUCTURE USING INSULATING OIL, AND BATTERY PACK AND VEHICLE COMPRISING SAME

CROSS-REFERENCE TO RELATED APPLICATIONS

The present application is a national phase entry under 35 U.S.C. § 371 of International Application No. PCT/KR2021/ 016281 filed Nov. 9, 2021, which claims priority from Korean Patent Application No. 10-2020-0151349 filed on Nov. 12, 2020, all of which are incorporated herein by reference.

TECHNICAL FIELD

The present disclosure relates to a battery module having a cooling structure using insulating oil, and a battery pack and a vehicle including the battery module. More specifically, the battery module has a structure in which insulating oil introduced into a module housing and cooling a battery cell may flow through an inner space of a bus bar frame into a cell stack assembly.

BACKGROUND ART

In the case of a battery module using an indirect water cooling method using cooling water, because cooling water does not directly contact a battery cell but rather indirectly contacts the battery cell through a module housing in which the battery cell is accommodated, there is a limit to its cooling performance. Also, because a cooling device such as a separate heat sink should be provided outside the module housing to form a passage for cooling, a volume of the battery module is inevitably increased, which may cause a loss in terms of energy density.

In order to solve the problems of the indirect water cooling method, there is a need to develop a battery module having a cooling structure in which insulating oil for cooling may be directly introduced into a module housing and may directly contact a battery cell.

In the case of a battery module having a direct cooling structure using insulating oil, it is important to develop a fluid passage structure for efficient cooling, but it is also very important to maintain airtightness so that the insulating oil does not leak to the outside of a module housing and an end plate.

In the case of a battery module having a structure in which insulating oil introduced into a module housing directly contacts a battery cell, an airtight structure should be applied to various positions to prevent the insulating oil filled in the module housing from leaking to the outside of the module housing.

For example, in the case of a battery module to which a mono frame with both sides open in a longitudinal direction, an airtight structure should be applied to prevent leakage of oil at a coupling portion between the mono frame and an insulating plate and/or an end plate covering both opening portions of the mono frame. Also, a high-potential terminal is usually exposed to the outside of the end plate and/or the insulating plate, and because a hole through which the high-potential terminal is exposed to the outside corresponds to a position where leakage of insulating oil is likely to occur, an airtight structure should also be applied.

As such, applying an airtight structure to various positions complicates a process of manufacturing a battery module, which leads to an increase in manufacturing cost. Accordingly, in order to omit the application of an airtight structure to a module housing or to simplify an airtight structure for a module housing, there is a need to develop a battery module in which an airtight structure is applied to components accommodated in the module housing.

DISCLOSURE

Technical Problem

The present disclosure is designed to solve the problems of the related art, and therefore the present disclosure is directed to allowing insulating oil for cooling of a battery module to directly contact a body of a battery cell to maximize cooling efficiency and effectively prevent leakage of insulating oil.

However, the technical purpose to be solved by the present disclosure is not limited to the above, and other objects not mentioned herein will be clearly understood by one of ordinary skill in the art from the following disclosure.

Technical Solution

In one aspect of the present disclosure, there is provided a battery module including a cell stack assembly, a front bus bar frame, and a rear bus bar frame. The cell stack assembly may include a plurality of battery cells and a plurality of fluid passage spacers located between adjacent battery cells. The front bus bar frame assembly may include a module inlet through which insulating oil for cooling of the plurality of battery cells is supplied to the plurality of fluid passage spacers, and the front bus bar frame assembly may be coupled to a side of the cell stack assembly in a longitudinal direction of the cell stack assembly to electrically connect the plurality of battery cells. The rear bus bar frame assembly may include a module outlet through which insulating oil passing through the module inlet and the plurality of fluid passage spacers is discharged to outside, and the rear bus bar frame assembly may be coupled to the opposite side of the cell stack assembly in the longitudinal direction of the cell longitudinal direction of the cell stack assembly to electrically connect the plurality of battery cells.

Each of the plurality of fluid passage spacers may include a spacer body, a spacer inlet, and a spacer outlet. The spacer body may have an open central portion so that insulating oil flowing inside the fluid passage spacer contacts the battery cell. The spacer inlet may be formed on a side of the spacer body in a longitudinal direction of the spacer body and fastened to the front bus bar frame assembly. The spacer outlet may be formed on the opposite side of the spacer body in the longitudinal direction of the spacer body and fastened to the rear bus bar frame assembly.

A first gasket may be located at a contact interface between the spacer body and the battery cell.

Each of the fluid passage spacer may further include a plurality of insulating oil guides configured to connect an upper end of the spacer body to a lower of the spacer body and may be spaced apart from one another in the longitudinal direction of the spacer body.

The front bus bar frame assembly may further include a front bus bar frame formed on a surface opposite the module inlet and a front frame fastening portion fastened to the spacer inlet, and a front bus bar provided on the front bus bar frame and coupled to electrode leads of the plurality of battery cells.

The rear bus bar frame assembly may further include a rear bus bar frame formed on a surface opposite the module outlet and a rear frame fastening portion fastened to the spacer outlet, and a rear bus bar provided on the rear bus bar frame and coupled to electrode leads of the plurality of battery cells.

A second gasket may be located between the front frame fastening portion and a coupling surface of the spacer inlet, and between the rear frame fastening portion and a coupling surface of the spacer outlet.

The battery module may further include a pair of side plates respectively covering a pair of battery cells located at both outermost positions in a stack direction of the cell stack assembly.

Each of the pair of side plates may include a space in which insulating oil may flow, and both end portions of the side plate in a longitudinal direction of the side plate may be respectively coupled to the front frame fastening portion and the rear frame fastening portion.

In another aspect of the present disclosure, the battery module is included in a battery pack and battery module.

Advantageous Effects

According to an aspect of the present disclosure, insulating oil for cooling of a battery module may directly contact a body of a battery cell, thereby maximizing cooling efficiency.

Also, according to another aspect of the present disclosure, leakage of insulating oil flowing inside a module housing may be effectively prevented while an insulating oil direct contact structure is used.

BRIEF DESCRIPTION OF DRAWINGS

The accompanying drawings illustrate a preferred embodiment of the present disclosure and together with the foregoing disclosure, serve to provide further understanding of the technical features of the present disclosure. However, the present disclosure is not construed as being limited to the drawings.

FIG. 6 is a partial cross-sectional view taken along line X-X' of FIG. 1.

DETAILED DESCRIPTION

Figure 1:
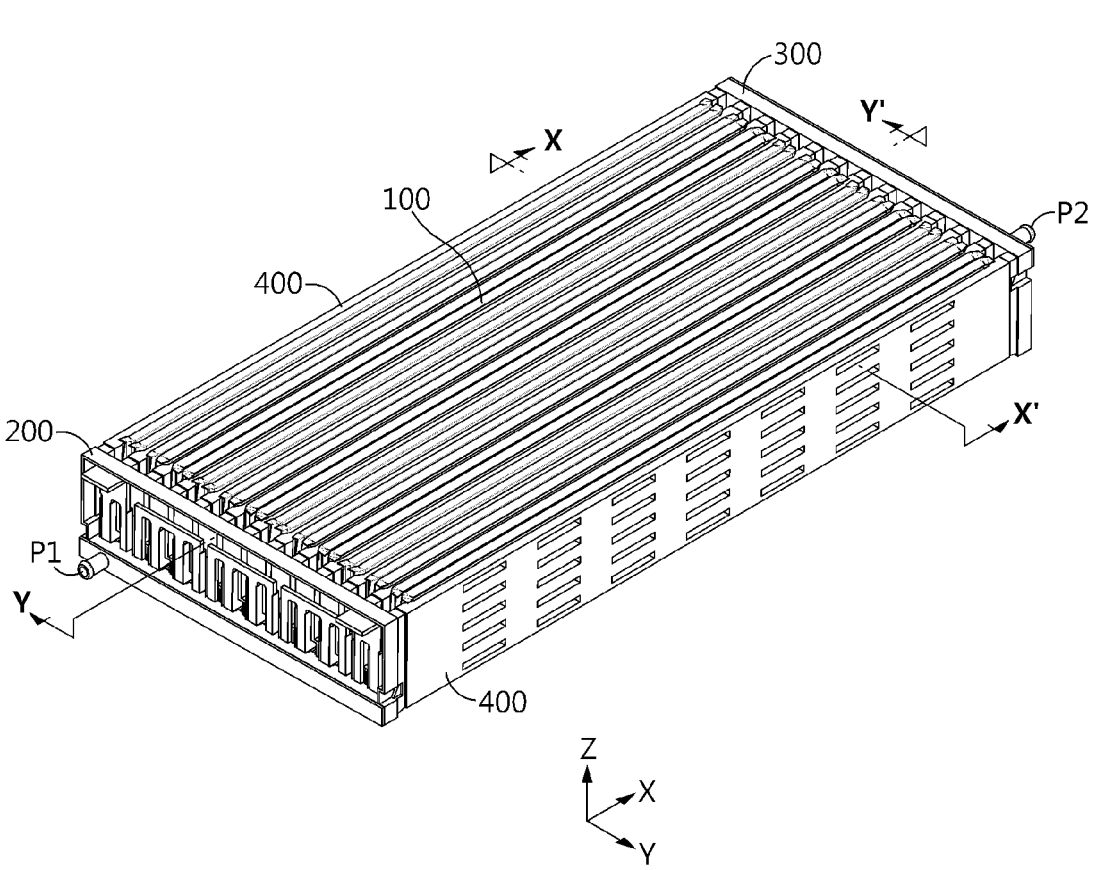
FIG. 1 is an assembled perspective view illustrating a battery module according to an embodiment of the present disclosure.
Figure 2:
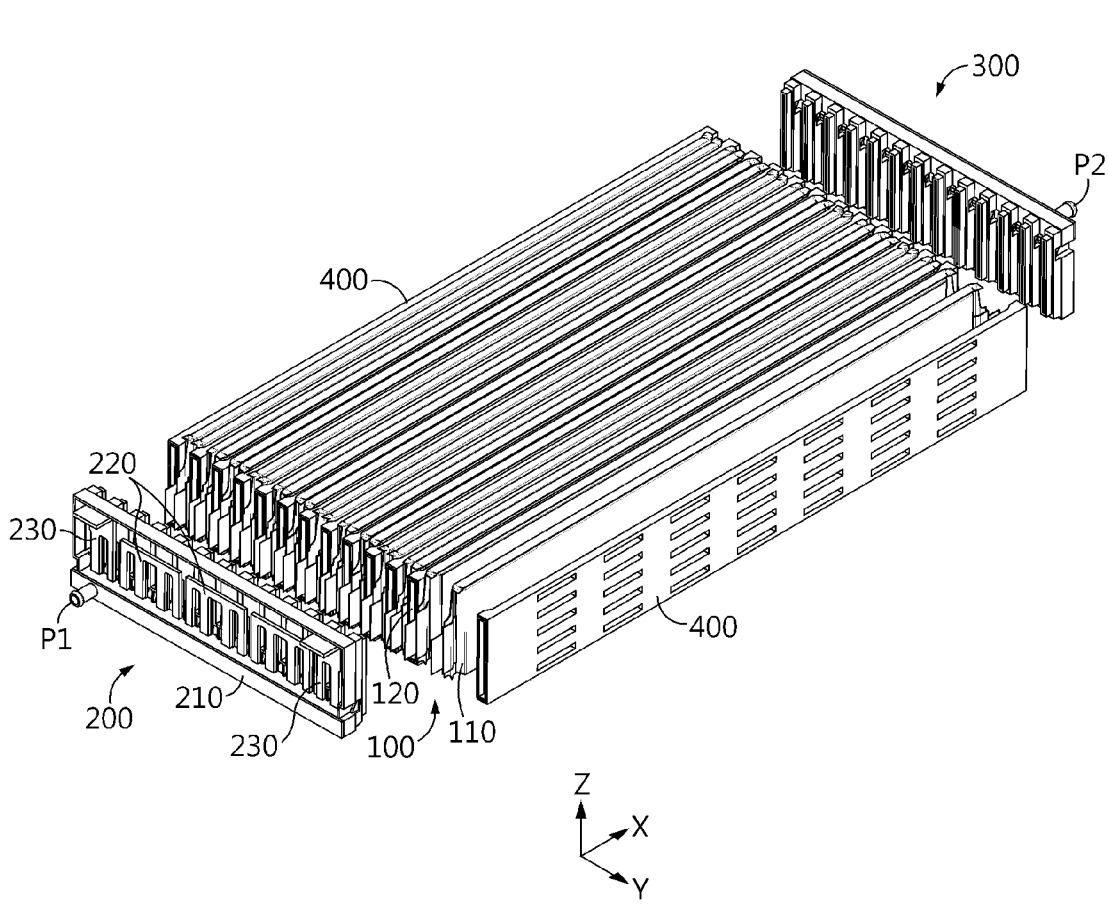
FIG. 2 is an exploded perspective view illustrating a battery module according to an embodiment of the present disclosure.
Figure 3:
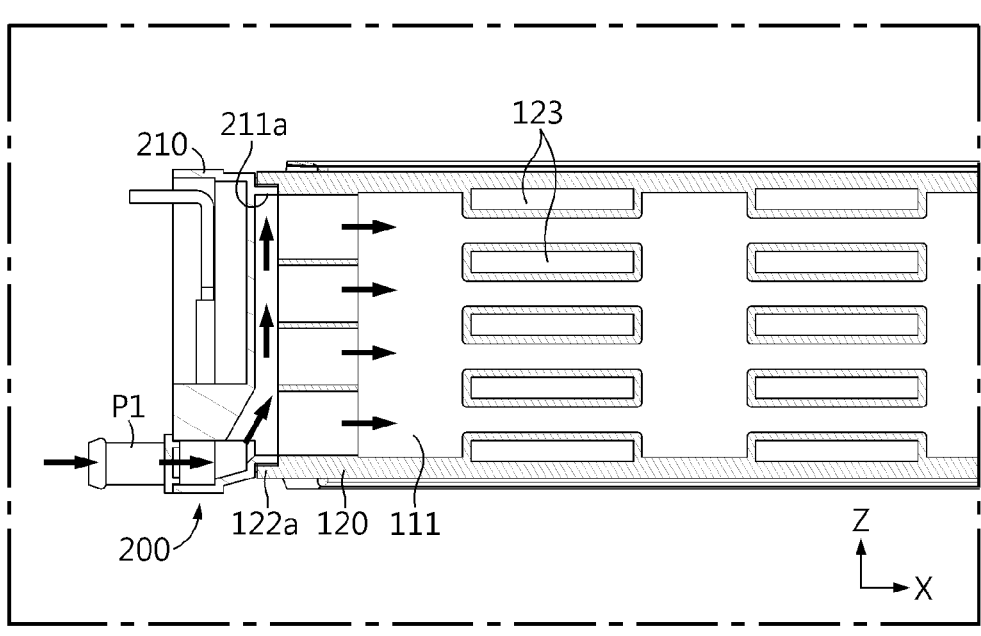
FIGS. 3 and 4 are cross-sectional views illustrating a flow of insulating oil for cooling, taken along line Y-Y' of FIG. 1.
Figure 4:
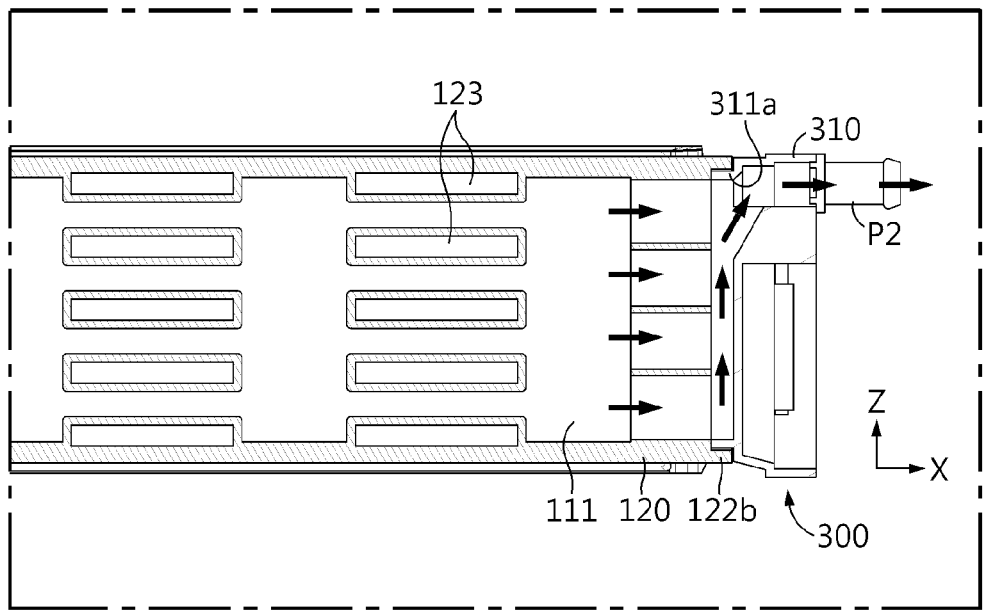

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Referring to FIGS. 1 through 5, a battery module according to an embodiment of the present disclosure includes a cell stack assembly 100, a front bus bar frame assembly 200, and a rear bus bar frame assembly 300. The battery module according to an embodiment of the present disclosure may further include a pair of side plates 400 in addition to the above elements.

The cell stack assembly 100 includes a plurality of battery cells 110, and a plurality of fluid passage spacers 120 located between adjacent battery cells.

The battery cell 110 may be a pouch-type battery cell including a cell body 111 and a pair of electrode leads 112 drawn out in opposite directions along a longitudinal direction parallel to an X-axis of the cell body 111.

The fluid passage spacer 120 is fastened to the front bus bar frame assembly 200, and includes a fluid passage communicating with a fluid passage formed inside the front bus bar frame assembly 200. The fluid passage spacer 120 includes a spacer body 121, a spacer inlet 122a, and a spacer outlet 122b. Further, the fluid passage spacer 120 may include a plurality of insulating oil guides 123 in addition to the above elements.

The spacer body 121 has an open central portion so that insulating oil flowing through the fluid passage spacer 120 contacts the cell body 111 of the battery cell 110. The spacer inlet 122a is formed on a side of the spacer body 121 along a longitudinal direction of the spacer body 121 and is fastened to the front bus bar frame assembly 200. The spacer outlet 122b is formed on the opposite of the spacer body 121 along the longitudinal direction of the spacer body 121 and fastened to the rear bus bar frame assembly 300. Due to this structure, insulating oil passing through the fluid passage formed inside the front bus bar frame assembly 200 is introduced through the spacer inlet 122a into the spacer body 121. The insulating oil introduced into the spacer body 121 contacts the cell body 111 to perform a cooling function, and then flows through the spacer outlet 122b into a fluid passage formed inside the rear bus bar frame assembly 300.

Figure 5:
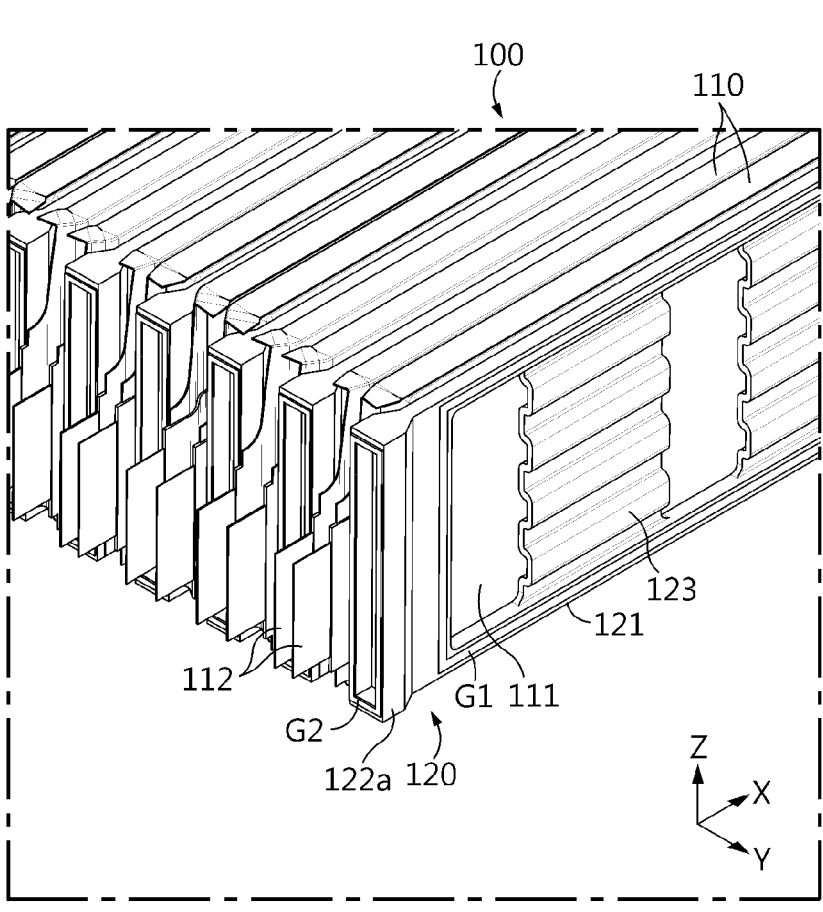
FIG. 5 is a partial enlarged view illustrating a cell stack assembly according to the present disclosure.
Figure 6:
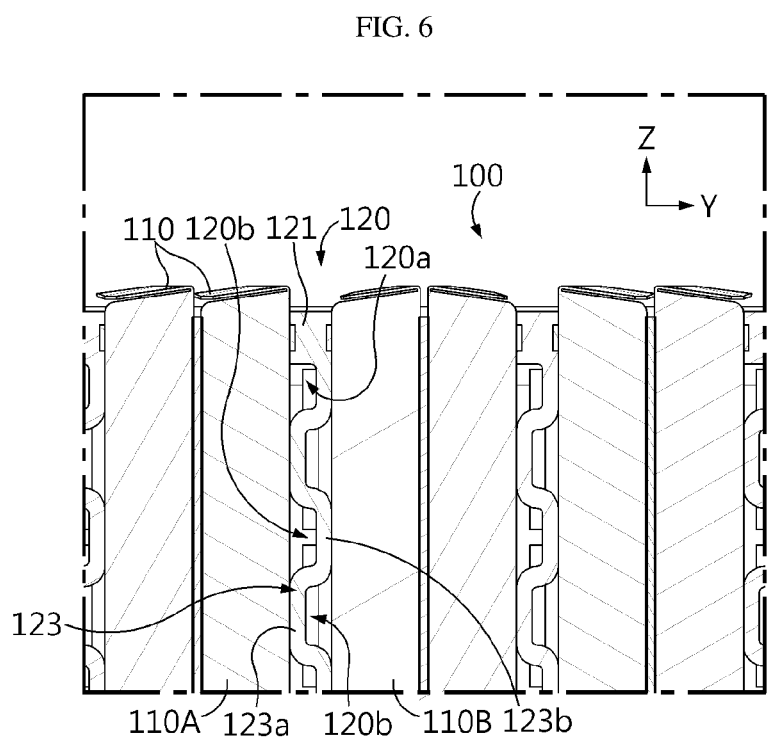

Referring to FIGS. 5 and 6, the insulating oil guide 123 connects an upper end of the spacer body 121 to a lower end of the spacer body 121. A plurality of insulating oil guides 123 are spaced apart from one another along the longitudinal direction parallel to the X-axis of the spacer body 121.

The insulating oil guide 123 is located in an open space formed in the central portion of the spacer body 121. The insulating oil guide 123 is bent multiple times along a width direction parallel to a Z-axis of the fluid passage spacer 120. Due to this bent shape, the insulating oil guide 123 includes a first contact area 123a configured to engage a first battery cell 110A located on a side of the fluid passage spacer 120 and a second contact area 123b configured to engage a second battery cell 110B located on the opposite side of the fluid passage spacer 120. The first contact area 123a and the second contact area 123b are alternately located along the width direction parallel to the Z-axis of the fluid passage spacer 120.

A first guide fluid passage 120a through which insulating oil may flow is formed between the first contact area 123a and the second battery cell 110B. A second guide fluid passage 120b through which insulating oil may flow is formed between the second contact area 123b and the first battery cell 110A. The first guide fluid passage 120a and the second guide fluid passage 120b are alternately formed along the width direction parallel to the Z-axis of the fluid passage spacer 120.

The insulating oil guide 123 divides a part of the open space formed in the central portion of the spacer body 121 to form the first guide fluid passage 120a and the second guide fluid passage 120b. Accordingly, a uniform amount of insulating oil may flow along the entire width direction parallel to the Z-axis of the fluid passage spacer 120, and the flow of insulating oil may be guided so that a flow rate of the insulating oil is maintained at a or above a certain level.

In order to prevent insulating oil passing through the open space formed in the central portion of the spacer body 121 and contacting the battery cell 110 from leaking into a gap between the battery cell 110 and the spacer body 121, a first gasket G1 may be located at a contact interface between the spacer body 121 and the cell body 111 of the battery cell 110.

Figure 7:
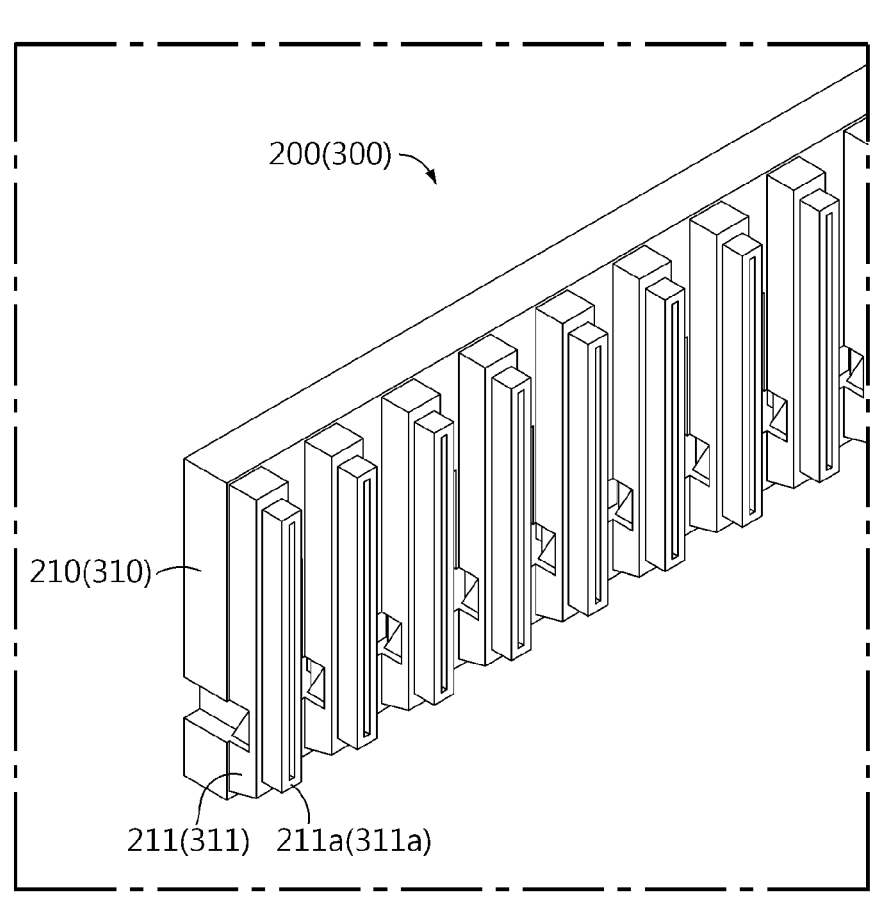
FIG. 7 is a view illustrating a front bus bar frame assembly (rear bus bar frame assembly) according to the present disclosure.
Figure 8:
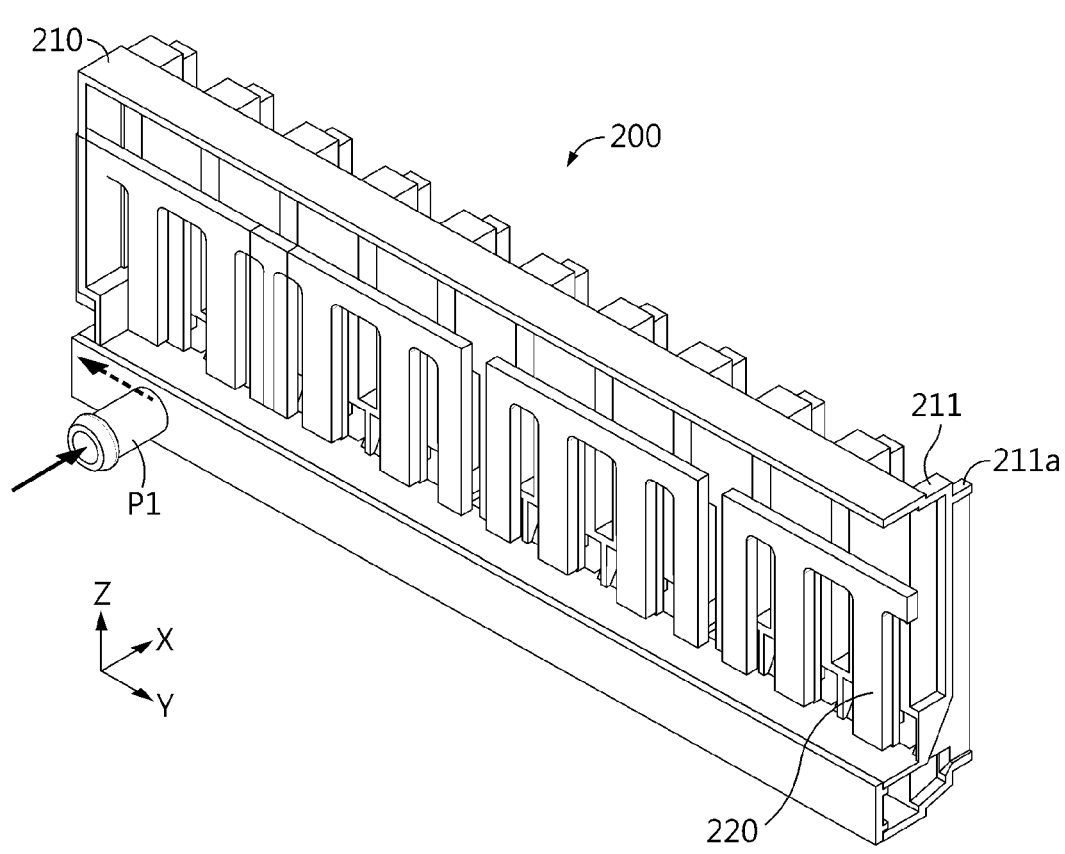
FIG. 8 is a cross-sectional view illustrating an internal fluid passage of a front bus bar frame assembly according to the present disclosure.

Referring to FIGS. 7 and 8 together with FIGS. 1-4, the front bus bar frame assembly 200 is coupled to a side of the cell stack assembly 100 along a longitudinal direction parallel to the X-axis of the cell stack assembly 100 configured to electrically connect the plurality of battery cells 110.

The front bus bar frame assembly 200 includes a front bus bar frame 210 and a plurality of front bus bars 220. Further, the front bus bar frame assembly 200 may include a pair of module terminals 230.

The front bus bar frame 210 includes a module inlet P1 that is connected to an outer surface of the front bus bar frame 210, through which insulating oil is injected, and a plurality of front frame fastening portions 211 formed on a surface opposite to the module inlet P21 and fastened to the spacer inlet 122a of the fluid passage spacer 120.

A fluid passage through which insulating oil may flow is formed inside the front bus bar frame 210, and communicates with the module inlet P1. Further, the fluid passage formed inside the front bus bar frame 210 communicates with a hole formed in the front frame fastening portion 211. Accordingly, insulating oil introduced through the module inlet P1 into the front bus bar frame 210 passes through the fluid passage formed inside the front bus bar frame 210 and flows into the fluid passage spacer 120. That is, the front frame fastening portion 211 functions as a supply port for supplying insulating oil from the front bus bar frame 210 to the fluid passage spacer 120.

The front frame fastening portion 211 protrudes from the front bus bar frame 210 toward the cell stack assembly 100, and a plurality of front frame fastening portions 211 are spaced apart from one another along a width direction parallel to a Y-axis of the battery module. The front frame fastening portions 211 are coupled to the plurality of fluid passage spacers 120 in a one-to-one manner.

A second gasket G2 for preventing leakage of insulating oil may be located between the front frame fastening portion 211 and a coupling surface of the spacer inlet 122a. Further, in order to increase a fastening force and improve airtightness between the front frame fastening portion 211 and the spacer inlet 122a, a front insertion portion 211a protruding toward the cell stack assembly 100 and inserted into the spacer inlet 122a may be provided on the front frame fastening portion 211. When the front insertion portion 211a and the second gasket G2 are applied together, the leakage preventing effect may be maximized.

The front bus bar 220 is provided on the front bus bar frame 210, and is coupled to the electrode leads 112 of the plurality of battery cells 110 to electrically connect the battery cells 110. The electrode leads 112 pass through a slit and/or a hole formed in the front bus bar frame 210 and are coupled to the front bus bar 220.

The pair of module terminals 230 are provided on the front bus bar frame 210, and are located on both sides of the front bus bar frame 210 along a longitudinal direction parallel to the Y-axis of the front bus bar frame 210. The pair of module terminals 230 function as high potential terminals by being connected to the electrode leads 112 of the battery cells 110 located at outermost positions from among the battery cells 110 constituting the cell stack assembly 100.

The rear bus bar frame assembly 300 has a very similar structure to that of the front bus bar frame assembly 200 in outer appearance. However, when compared to the front bus bar frame assembly 200, the rear bus bar frame assembly 300 is different in that the rear bus bar frame assembly 300 is provided at the rear of the battery module, a module outlet P2 instead of the module inlet P1 is provided, and the module terminal 230 is not provided, but other elements are substantially the same.

Accordingly, in describing the rear bus bar frame assembly 300, the same description as that made for the front bus bar frame assembly 200 will not be repeatedly provided, and only a difference will be mainly described.

The rear bus bar frame assembly 300 includes a rear bus bar frame 310 and a plurality of rear bus bars (not shown). The rear bus bar is different in an installation position, but is substantially the same as the front bus bar 220 in terms of shape and function.

The rear bus bar frame 310 includes the module outlet P2 that is connected to an outer surface of the rear bus bar frame 310 and through which insulating oil is discharged. A plurality of rear frame fastening portions 311 are formed on a surface opposite to the module outlet P2 and are fastened to the spacer outlet 122b of the fluid passage spacer 120.

A fluid passage through which insulating oil may flow is formed inside the rear bus bar frame 310 and communicates with the module outlet P2. Further, the fluid passage formed inside the rear bus bar frame 310 communicates with a hole formed in the rear frame fastening portion 311. Accordingly, insulating oil introduced through the spacer outlet 122b of the insulating oil spacer 120 into the rear bus bar frame 310 passes through the fluid passage formed inside the rear bus bar frame 310 and is discharged to the outside of the battery module through the module outlet P2. That is, the rear frame fastening portion 311 functions as a receiving port for receiving insulating oil passing through the fluid passage spacer 120 into the rear bus bar frame 310.

The rear frame fastening portion 311 protrudes from the rear bus bar frame 310 toward the cell stack assembly 100, and a plurality of rear frame fastening portions 311 are spaced apart from one another along the width direction parallel to the Y-axis of the battery module. The rear frame fastening portions 311 are coupled to the plurality of the fluid passage spacers 120 in a one-to-one manner.

The second gasket G2 for preventing leakage of insulating oil may be located between the rear frame fastening portion 311 and a coupling surface of the spacer outlet 122b. Also, in order to increase a fastening force and improve airtightness between the rear frame fastening portion 311 and the spacer outlet 122b, a rear insertion portion 311a protruding toward the cell stack assembly 100 and inserted into the spacer outlet 122*b* may be provided on the rear frame fastening portion 311. When the rear insertion portion 311*a* and the second gasket G2 are applied together, leakage preventing effect may be maximized.

The pair of side plates 400 cover a pair of battery cells 110 located at both outermost positions of the cell stack assembly 100 along a stack direction parallel to the Y-axis of the cell stack assembly 100. Both end portions of the side plate 400 along a longitudinal direction parallel to the X-axis of the side plate 400 may be respectively fastened to the front bus bar frame assembly 200 and the rear bus bar frame assembly 300.

The side plate 400 may have a space in which insulating oil may flow, and in order to communicate with the module inlet P1 and the module outlet P2, a side of the side plate 400 along the longitudinal direction parallel to the X-axis of the side plate 400 may be fastened to the spacer inlet 122*a* of the fluid passage spacer 120. The opposite side of the side plate 400 along the longitudinal direction parallel to the X-axis of the side plate 400 may be fastened to the spacer outlet 122*b* of the fluid passage spacer 120. In this case, the side plates 400 may function as support plates supporting the cell stack assembly 100 from both sides along the stack direction parallel to the Y-axis of the cell stack assembly 100, and may perform a cooling function for the battery cells 110 located at outermost positions in the stack direction of the cell stack assembly 100.

As described above, a battery module according to an embodiment of the present disclosure may allow insulating oil for cooling a battery module to directly contact a cell body, thereby maximizing cooling efficiency and effectively preventing leakage of insulating oil which is likely to occur in this insulating oil direct contact structure.

A battery pack according to an embodiment of the present disclosure includes at least one battery module according to an embodiment of the present disclosure as described above. A vehicle according to an embodiment of the present disclosure includes the battery module or the battery pack according to an embodiment of the present disclosure as described above.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

What is claimed is:

1. A battery module comprising:
a cell stack assembly comprising a plurality of battery cells and a plurality of fluid passage spacers located between adjacent ones of the battery cells;
a front bus bar frame assembly comprising a module inlet on a front side of the front bus bar frame assembly, the front bus bar frame assembly being coupled to a front side of the cell stack assembly along a longitudinal direction of the cell stack assembly, wherein the module inlet is configured to allow insulating oil for cooling the plurality of battery cells to be supplied to the plurality of fluid passage spacers through a plurality of front frame fastening portions that are provided on a rear side of the front bus bar frame assembly and are in communication with a common opening of the module inlet, and the front bus bar assembly electrically connects the plurality of battery cells; and
a rear bus bar frame assembly comprising a module outlet, the rear bus bar frame assembly being coupled to a rear side of the cell stack assembly along the longitudinal direction of the cell stack assembly, wherein the module outlet is configured to allow the insulating oil passing through the module inlet and the plurality of fluid passage spacers to be discharged to an outside of the rear bus bar frame, and electrically connects the plurality of battery cells.

2. The battery module of claim 1, wherein each of the plurality of fluid passage spacers includes:
a spacer body, wherein an open central portion allows insulating oil to flow inside the fluid passage spacer and contact the battery cell;
a spacer inlet formed on a front side of the spacer body along a longitudinal direction of the spacer body and coupled to the front bus bar frame assembly; and
a spacer outlet formed on a rear side of the spacer body along the longitudinal direction of the spacer body and coupled to the rear bus bar frame assembly.

3. The battery module of claim 2, wherein a first gasket is positioned at a contact interface between the spacer body and the battery cell.

4. The battery module of claim 2, wherein the fluid passage spacer further comprises a plurality of insulating oil guides configured to connect an upper end of the spacer body to a lower of the spacer body, the plurality of insulating oil guides being spaced apart from one another along the longitudinal direction of the spacer body.

5. The battery module of claim 2, wherein the plurality of front frame fastening portions are coupled to the spacer inlets of the plurality of fluid passage spacers, and the front bus bar frame assembly further includes
a front bus bar provided on the front bus bar frame and coupled to electrode leads of the plurality of battery cells.

6. The battery module of claim 5, wherein the rear bus bar frame assembly further includes:
a plurality of fastening portions formed on a front side of the rear bus bar frame assembly coupled to respective spacer outlets of the plurality of fluid passage spacers; and a rear bus bar provided on the rear bus bar frame and coupled to electrode leads of the plurality of battery cells.

7. The battery module of claim 6, wherein a gasket is positioned between the plurality of front frame fastening portions and coupling surfaces of the spacer inlets; and the second gasket is positioned between the rear frame fastening portion and a coupling surface of the spacer outlet.

8. The battery module of claim 6, further comprising a pair of side plates covering a respective pair of the battery cells located at both outermost positions in a stack direction of the cell stack assembly, the plurality of battery cells being stacked along the stack direction to define the cell stack assembly.

9. The battery module of claim 8, wherein each of the pair of side plates comprises a space in which insulating oil may flow, and both end portions of the side plates along a longitudinal direction of the side plates are respectively coupled to the front frame fastening portion and the rear frame fastening portion.

10. A battery pack comprising the battery module according to claim 1.

11. A vehicle comprising the battery module according to claim 1.

* * * * *